(12) United States Patent
Zheng

(10) Patent No.: US 11,326,725 B2
(45) Date of Patent: May 10, 2022

(54) ADAPTER FOR AN EXPANDABLE HOSE

(71) Applicant: Aiqi Zheng, GuangDong (CN)

(72) Inventor: Aiqi Zheng, GuangDong (CN)

(*) Notice: Subject to any disclaimer, the term of this patent is extended or adjusted under 35 U.S.C. 154(b) by 24 days.

(21) Appl. No.: 16/869,587

(22) Filed: May 7, 2020

(65) Prior Publication Data

US 2020/0355305 A1 Nov. 12, 2020

Related U.S. Application Data

(60) Provisional application No. 62/860,168, filed on Jun. 11, 2019, provisional application No. 62/844,612, filed on May 7, 2019.

(51) Int. Cl.
*F16L 33/22* (2006.01)
*F16L 37/10* (2006.01)

(52) U.S. Cl.
CPC .......... *F16L 33/223* (2013.01); *F16L 37/101* (2013.01)

(58) Field of Classification Search
CPC ....... F16L 33/20; F16L 33/223; F16L 33/224; F16L 33/226
USPC ........................................................ 285/245
See application file for complete search history.

(56) References Cited

U.S. PATENT DOCUMENTS

| 2006/0097517 | A1* | 5/2006 | Wu ....................... F16L 33/223 |
| 2015/0167875 | A1* | 6/2015 | Huang ................. F16L 33/224 |
| 2019/0226615 | A1* | 7/2019 | Wu ....................... F16L 33/224 |
| 2019/0242502 | A1* | 8/2019 | Pan ....................... F16L 33/223 |
| 2019/0277431 | A1* | 9/2019 | Shemtov |
| 2021/0062952 | A1* | 3/2021 | De Nora ............... F16L 33/223 |

\* cited by examiner

*Primary Examiner* — Zachary T Dragicevich

(57) ABSTRACT

An adapter for an expandable hose is an apparatus used to connect an expandable hose to other fluid management tools. The apparatus is also configured to prevent leakages in multi-channel expandable hoses. An objective of the apparatus is to provide a connection for expandable hoses. The apparatus is designed to prevent leakage between expandable hoses and the apparatus. A threaded connector enables attachment of the expandable hose to other hoses. Another unit fits inside the inner channel of an expandable hose, while a third part surrounds the inner channel of the expandable hose. An annular fastener secures the outer channel of the expandable hose to the inner channel. A cover or housing may be added to protect components from damage due to external stimuli. Altogether, the apparatus enables a user to securely attach an expandable hose to a spout, faucet, spicket, another hose, or a variety of other devices.

11 Claims, 7 Drawing Sheets

ADAPTER FOR AN EXPANDABLE HOSE

The current application claims a priority to the U.S. Provisional Patent application Ser. No. 62/844,612 filed on May 7, 2019 and a priority to the U.S. Provisional Patent application Ser. No. 62/860,168 filed on Jun. 11, 2019.

FIELD OF THE INVENTION

The present invention generally relates to tools and hardware for managing fluids. More specifically, the present invention relates to hardware which facilitates the connection of expandable hoses to spouts, nozzles, or other fluid manipulation tools.

BACKGROUND OF THE INVENTION

Expandable hoses have become more popular choices over traditional hoses due to their relatively greater flexibility, durability, and fatigue resistance. Expandable hoses are also often easier to operate and store due to their expanding capabilities, which reduce their overall size and unwieldiness for storage and transportation purposes while enabling expansion for operation. Expandable hoses utilize an inner tube to provide the primary water-transportation means and an outer sleeve to serve as protection against damage from external sources during use. In addition, there are various accessories for expandable hoses which improve their functionality and capabilities such as connectors or nozzles. However, there are few accessories designed for multi-channel expandable hoses which prevent leakage while allowing for multiple accessories to be connected to the expandable hose. What is needed is a device that improves use of such hoses and accessories by improving their connection mechanism, optimizing for intuition and fluid transfer quality.

The present invention addresses this issue. An objective of the present invention is to provide a connection for expandable hoses. The present invention is designed to prevent any possible leakage between one or more expandable hoses and the present invention. A threaded connector enables attachment of the expandable hose to other hoses. Another unit fits inside the inner channel of an expandable hose, while a third part surrounds the inner channel of the expandable hose. An annular fastener secures the outer channel of the expandable hose to the inner channel. A cover or housing may be added to protect components from damage due to external stimuli. Altogether, the present invention enables a user to securely attach an expandable hose to a spout, faucet, spicket, another hose, or a variety of other devices and tools.

DETAILED DESCRIPTION OF THE INVENTION

All illustrations of the drawings are for the purpose of describing selected versions of the present invention and are not intended to limit the scope of the present invention.

Figure 1:
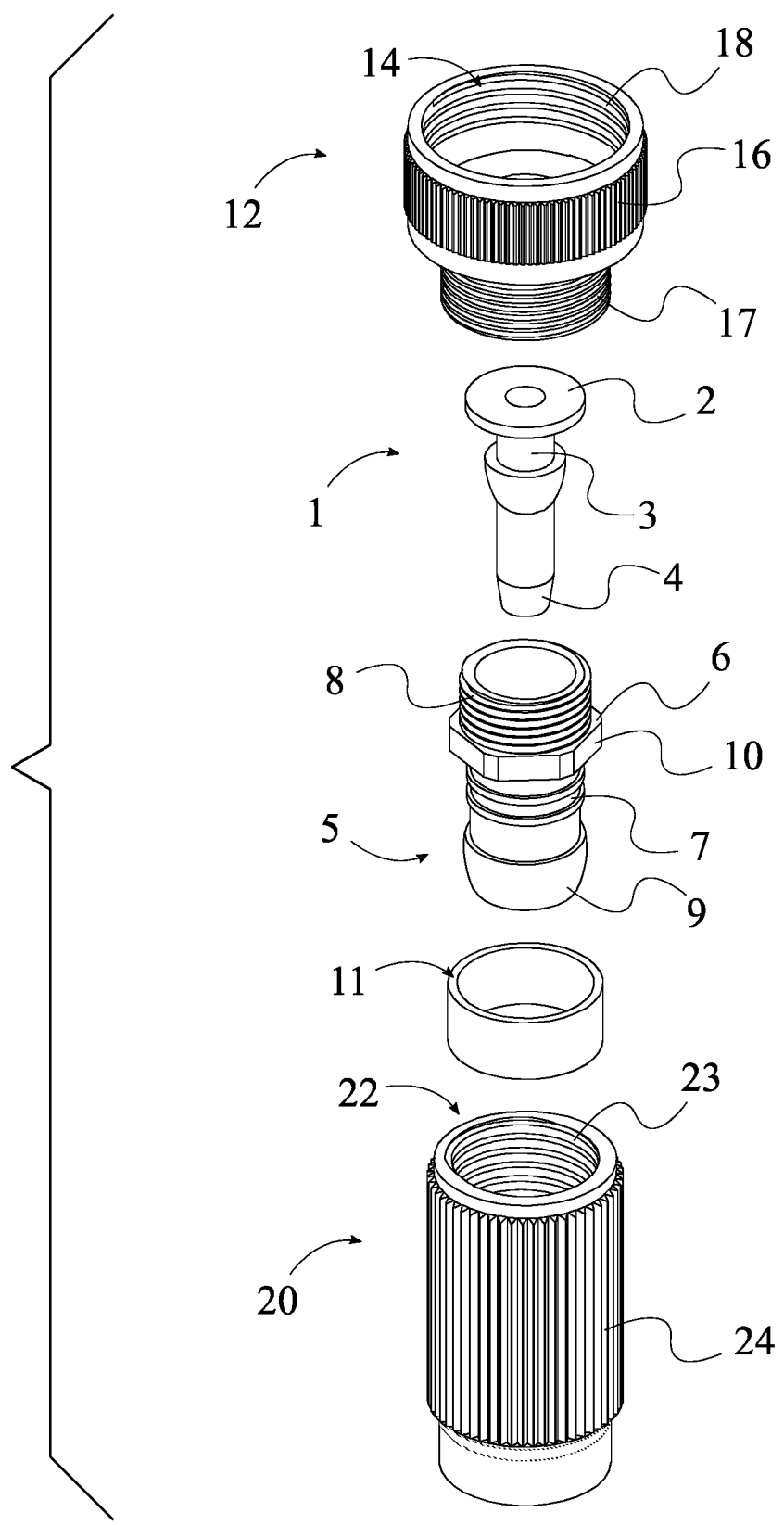
FIG. 1 is an exploded top perspective view of the present invention.
Figure 6:
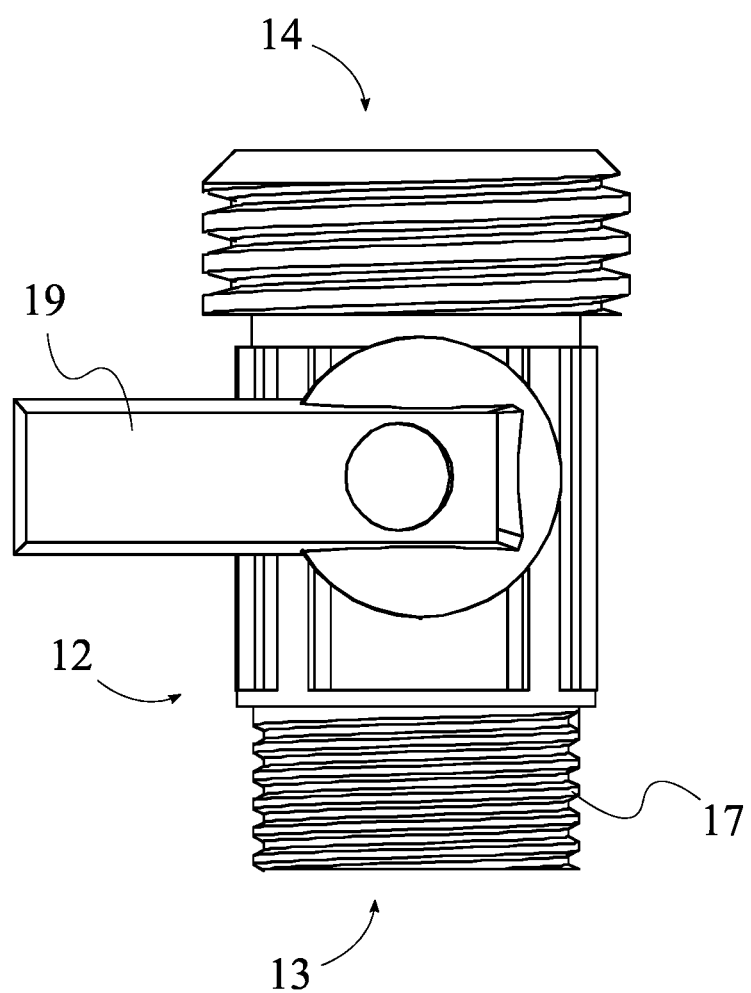
FIG. 6 is a front view of an interchangeable hose connector of the present invention.
Figure 7:
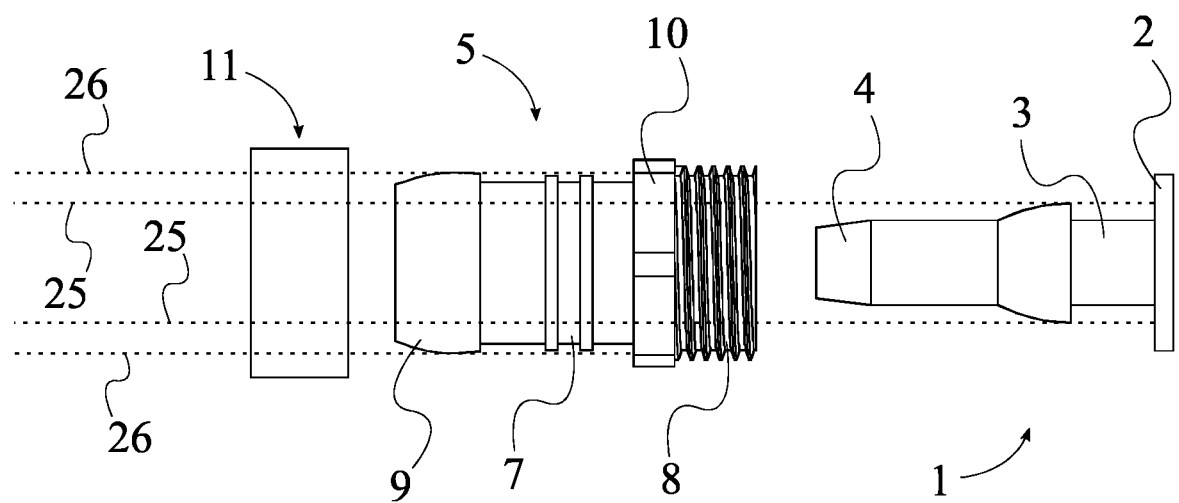
FIG. 7 is a schematic view representing an extendable hose mounted on the present invention.

The present invention is an adapter for an expandable hose that is used to connect an expandable hose to other fluid management tools and devices. The present invention is also configured to prevent leakages in multi-channel expandable hoses. A preferred embodiment of the present invention comprises a tubular insert 1, a tubular brace 5, and an annular crimp 11, as shown in FIGS. 1 and 6. The tubular insert 1 is an elongated device that preferably serves as the innermost tube, thus coming into direct contact with the fluid moving through an expandable hose. The tubular brace 5 relates to a connector that enables appropriate arrangement of an expandable hose relative to the tubular insert 1 and the annular crimp 11. The annular crimp 11 is a ring-shaped fastener that, in the preferred usage of the present invention, secures an expandable hose in place against the tubular brace 5.

The general configuration of the aforementioned components allows the present invention to efficiently and effectively join an expandable hose to a desirable fluid transfer device. The tubular insert 1 comprises an insert flange 2, an insert annular groove 3, and an insert wedging feature 4, as shown in FIG. 1. The insert flange 2 relates to a generally flat disk-shaped unit which prevents the tubular insert 1 from sliding into the tubular brace 5 during use. The insert annular groove 3 is preferably a recessed space of the tubular insert 1 which enhances the ability of the insert flange 2 to retain the inner tube 25 of an expandable hose through friction against the generally smooth inside surface of the inner tube of an expandable hose. The insert wedging feature 4 relates to a hollow fixture that facilitates insertion of the tubular insert 1 into an inner tube. Moreover, the tubular brace 5 comprises a brace flange 6, a brace annular groove 7, a brace male-threading feature 8, and a brace wedging feature 9. The brace flange 6 relates to an edge of the tubular brace 5 that enables appropriate arrangement of the tubular insert 1 relative to the tubular brace 5. The brace annular groove 7 is preferably a recessed space of the tubular brace 5 that enhances the ability of the tubular brace 5 to retain the outer tube 26 of an expandable hose through friction against the generally smooth inside surface of the outer tube of an expandable hose. The brace male-threading feature 8 is a helical protrusion that enables connection to a standardized inversely-threaded helical channel on a variety of other fluid transportation devices. The brace wedging feature 9 relates to a hollow fixture that, in the preferred usage of the present invention, facilitates insertion of the tubular brace 5 into the outer tube of an expandable hose while allowing the inner tube of an expandable hose to pass through the tubular brace 5.

In order to allow the present invention to enable flow into and out of an expandable hose, the components are configured to appropriately interact with each other. The insert flange 2 and the insert wedging feature 4 are positioned opposite to each other along the tubular insert 1. This arrangement allows for appropriate alignment of the inner tube of an expandable hose about the tubular insert 1. The insert annular groove 3 is laterally positioned around the tubular insert 1, adjacent to the insert flange 2. Thus, the insert annular groove 3 is positioned to provide a friction fit for the inner tube of an extendable hose, and the insert flange 2 is positioned to prevent the tubular insert 1 from traversing too far into the extendable hose during use. The brace male-threading feature 8 and the brace wedging feature 9 are positioned opposite to each other along the tubular brace 5. In this way, the brace male-threading feature 8 does not functionally interfere with the brace wedging feature 9. The brace flange 6 is laterally positioned around the tubular brace 5, adjacent to the brace male-threading feature 8, as seen in FIG. 1. This arrangement enables the brace male-threading feature 8 to connect to a female threaded object up to the brace flange 6. The brace annular groove 7 is laterally positioned around the tubular brace 5. In this way, the brace annular groove 7 may assist with the retention of the outer tube of an extendable hose. The brace annular groove 7 is positioned adjacent to the brace flange 6, opposite the brace male-threading feature 8. This arrangement makes application of the present invention more intuitive as the extendable hose optimally connects to the brace annular groove 7. The insert annular groove 3 and the insert wedging feature 4 are positioned inside the tubular brace 5. In this way, the tubular insert 1 extends within the tubular brace 5 to provide a connection mechanism for the inner tube of an extendable hose. This allows the tubular insert 1 to be placed within an open end of the inner tube so that the open end of the inner tube is pressed in between the tubular insert 1 and the tubular brace 5. The insert flange 2 is positioned outside the tubular brace 5. In this way, the insert flange 2 prevents the tubular insert 1 from extending too far into the tubular brace 5. The insert flange 2 is pressed against the brace male-threading feature 8. Thus, the insert flange 2 ensures a snug fit of the tubular insert 1 within the tubular brace 5. Finally, the annular crimp 11 is mounted around the brace annular groove 7. This arrangement enables the annular crimp 11 to secure the outer tube of an extendable hose against the tubular brace 5, especially adjacent to the brace annular groove 7.

Figure 3:
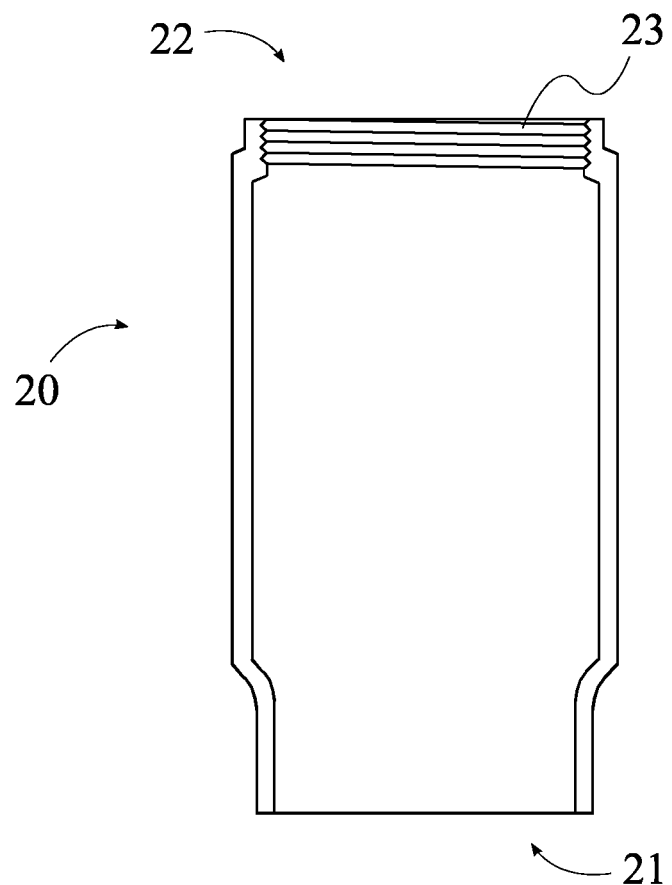
FIG. 3 is a schematic view representing the rigid sleeve of the present invention.

The present invention may require connection to a spout or water source that allows for pressure and flow adjustment. To enable such a connection, the present invention may further comprise at least one interchangeable hose connector 12, as shown in FIG. 3. The at least one interchangeable hose connector 12 relates to a mechanism by which the tubular insert 1 and the tubular brace 5 may connect to a water source or supply or may connect to a variety of other devices. The at least one interchangeable hose connector 12 comprises a connector inlet 13, a connector outlet 14, and a first connector female-threading feature 15. The connector inlet 13 relates to an opening through which fluid may enter/exit the at least one interchangeable hose connector 12. The connector outlet 14 is an opening through which fluid may enter/exit the at least one interchangeable hose connector 12. The first connector female-threading feature 15 relates to a helical channel by which the at least one interchangeable hose connector 12 may connect to a male-threaded device of similar helical dimensions. The connector inlet 13 is in fluid communication with the connector outlet 14. Thus, fluid may flow through the at least one interchangeable hose connector 12. The connector inlet 13 and the connector outlet 14 are positioned opposite to each other about the at least one interchangeable hose connector 12. This arrangement allows the at least one interchangeable hose connector 12 to transfer fluids to and from the tubular insert 1 and the tubular brace 6. The first connector female-threading feature 15 is positioned within the connector inlet 13. This arrangement enables the connector inlet 13 to securely fasten to a male-threaded object without loss of fluid. The first connector female-threading feature 15 is integrated into the connector inlet 13. Thus, the first connector female-threading feature 15 provides a secure fastening mechanism for the tubular brace 5.

The first connector female-threading feature 15 requires the application of torque to join the at least one interchangeable hose connector 12 to external tools or devices. To this end, the at least one interchangeable hose connector 12 may further comprise a plurality of connector gripping ridges 16, as shown in FIG. 1. The plurality of connector gripping ridges 16 relates to a set of preferably linear protrusions which provide increased surface area, thereby enhancing the ability of the user to grip the at least one interchangeable hose connector 12 for the subsequent application of appropriate torque. The plurality of connector gripping ridges 16 is laterally connected to the connector outlet 14. This arrangement provides the user with adequate access to the plurality of connector gripping ridges 16. The plurality of connector gripping ridges 16 is distributed about the connector outlet 14. In this way, the plurality of connector gripping ridges 16 provides equal advantage to the user for applying torque regardless of where the user grips the plurality of connector gripping ridges 16.

Figure 5:
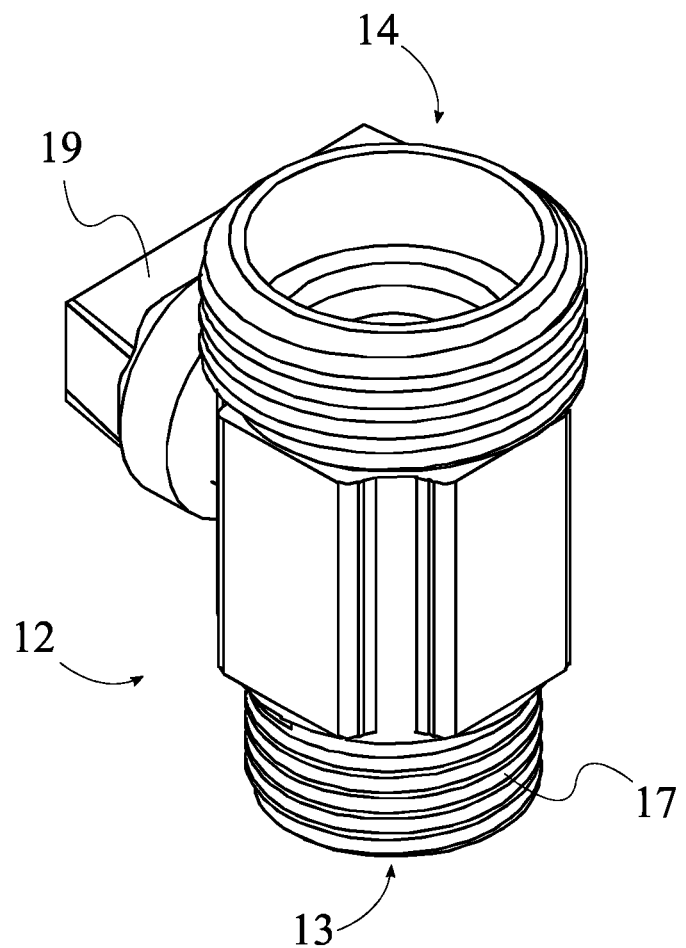
FIG. 5 is a top perspective view of an interchangeable hose connector of the present invention.

In some embodiments, the at least one interchangeable hose connector 12 may need to connect to protective components that prevent damage to the present invention. To achieve this, the at least one interchangeable hose connector 12 may further comprise a connector male-threading feature 17, as shown in FIG. 5. The connector male-threading feature 17 relates to a helical protrusion that enables connection to a correspondingly-sized female-threading feature on a variety of housing components or other components with a male-threading feature. The connector male-threading feature 17 is laterally connected about the connector inlet 13. This arrangement ensures that the connector male-threading feature 17 is accessible to various devices with female-threaded features.

Figure 4:
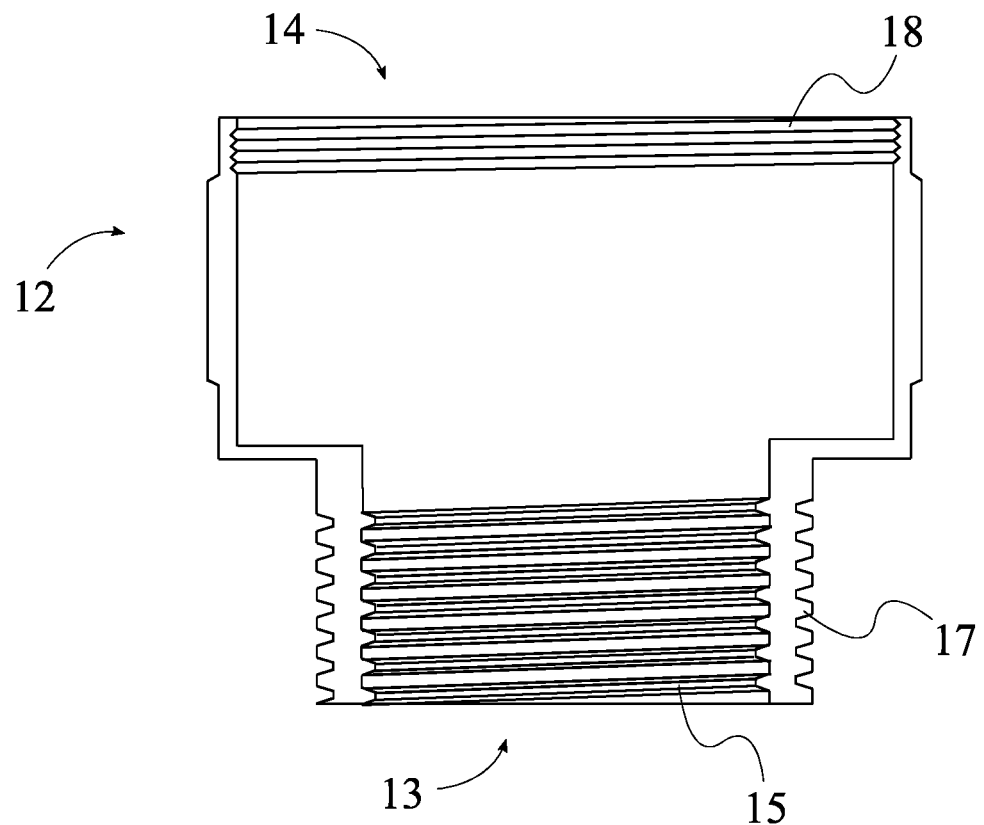
FIG. 4 is a schematic view representing an interchangeable hose connector of the present invention.

The user may desire to attach the at least one interchangeable hose connector 12 to a device with female threading. To this end, at least one interchangeable hose connector 12 may further comprise a second connector female-threading feature 18, as shown in FIG. 4. The second connector female-threading feature 18 relates to a helical channel by which the at least one interchangeable hose connector 12 may connect to a male-threaded device of similar helical dimensions. The second connector female-threading feature 18 is positioned within the connector outlet 14. Thus, the second connector female-threading feature 18 enables connection of the at least one interchangeable hose connector 12 to a variety of housing components or other components with male-threading features. The second connector female-threading feature 18 is integrated into the connector outlet 14. This arrangement prevents fluid losses during fluid transfer.

It may be further desirable to enable the at least one interchangeable hose connector 12 to moderate the flow into the present invention. To achieve this goal, the at least one interchangeable hose connector 12 may further comprise a connector valve 19, as shown in FIG. 5. The connector valve 19 preferably relates to a ball valve but may relate to any of a variety of fluid-flow-controlling valves. The connector valve 19 is positioned in between the connector inlet 13 and the connector outlet 14. This arrangement allows the connector valve 19 to contact the fluid flowing between the connector inlet 13 and the connector outlet 14. The connector inlet 13 is in fluid communication with the connector outlet 14 through the connector valve 19. Thus, the connector valve 19 controls fluid flow through the at least one interchangeable hose connector 12.

Figure 2:
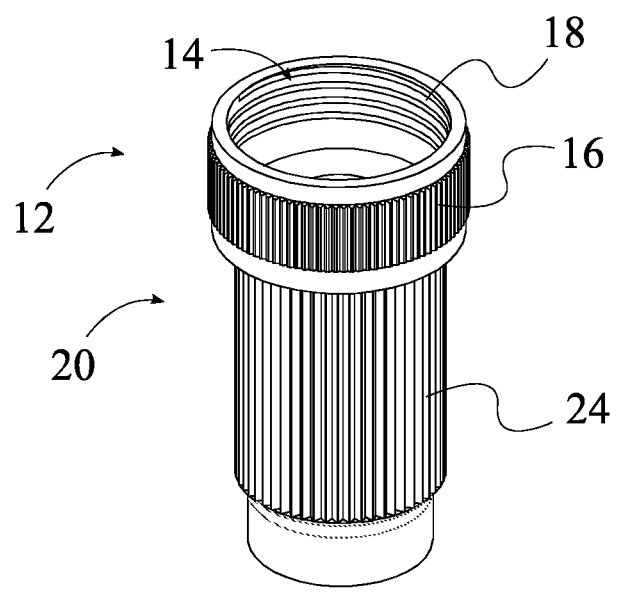
FIG. 2 is a top perspective view of the present invention.

The present invention benefits from the inclusion of protective components. To provide for this need, the present invention may further comprise a rigid sleeve 20, as shown in FIG. 2. The rigid sleeve 20 relates to a preferably metal housing that shelters the present invention and an end of an expandable hose from potential damage due to a variety of external factors. The rigid sleeve 20 comprises a first open end 21 and a second open end 22. The first open end 21 and the second open end 22 allow an expandable hose to traverse through the rigid sleeve 20. The rigid sleeve 20 is mounted around the tubular insert 1, the tubular brace 5, and the annular crimp 11. This arrangement allows the rigid sleeve 20 to protect the tubular insert 1, the tubular brace 5, and the annular crimp 11 as well as an attached end of an expandable hose. The tubular insert 1, the tubular brace 5, and the annular crimp 11 are positioned offset from the first open end 21 so that the rigid sleeve 20 is able to extend along and protect an attached end of an expandable hose. The tubular insert 1, the tubular brace 5, and the annular crimp 11 are positioned adjacent to the second open end 22. Thus, the second open end 22 enables attachment of the rigid sleeve 20 to the present invention.

To connect the rigid sleeve 20 to the present invention effectively, the user may wish to join the present invention with a threaded connector. To achieve this, the present invention further comprises at least one interchangeable hose connector 12. Such an arrangement provides a feature which is appropriately arranged relative to the tubular insert 1, the tubular brace 5, and the annular crimp 11. The at least one interchangeable hose connector 12 comprises a connector inlet 13, a connector outlet 14, and a connector male-threading feature 17, as shown in FIG. 1. The rigid sleeve 20 further comprises a sleeve female-threading feature 23. The sleeve female-threading feature 23 relates to a helical channel that enables engagement with a variety of items that utilize male-threading features. The connector inlet 13 is in fluid communication with the connector outlet 14. Furthermore, the connector inlet 13 and the connector outlet 14 are positioned opposite to each other about the at least one interchangeable hose connector 12. This arrangement enables transfer of fluid through the at least one interchangeable hose connector 12. The connector male-threading feature 17 is laterally connected about the connector inlet 13. This provides easy access for connection of the sleeve female-threading feature 23. The sleeve female-threading feature 23 is positioned within the second open end 22. In this way, the sleeve female-threading feature 23 is positioned optimally for engagement with the connector male-threading feature 17. The sleeve female-threading feature 23 is integrated into the second open end 22. Therefore, the sleeve female-threading feature 23 allows for rigid connection between the rigid sleeve 20 and the at least one interchangeable hose connector 12. Further, the sleeve female-threading feature 23 is engaged by the connector male-threading feature 17. This arrangement secures the rigid sleeve 20 to the at least one interchangeable hose connector 12.

The user may benefit from the inclusion of components that enhance the ability of the user to apply torque necessary for joining threaded components together. To provide this need, the present invention may further comprise a plurality of sleeve gripping ridges 24, as shown in FIG. 1. The plurality of sleeve gripping ridges 24 relates to a set of preferably linear protrusions which provide increased surface area, thereby enhancing the ability of the user to grip the present invention for the subsequent application of appropriate torque. The plurality of connector gripping ridges 16 is laterally connected to the rigid sleeve 20. This arrangement provides the user with adequate access to the plurality of sleeve gripping ridges 24. The plurality of sleeve gripping ridges 24 is distributed about the rigid sleeve 20. In this way, the user has enhanced ability to connect the rigid sleeve 20 to other components.

The user may need to apply more torque than possible using grip strength alone in order to attach the at least one interchangeable hose connector 12 to the tubular brace 5. To provide for this need, the tubular brace 5 further comprises a wrench-engaging feature 10, as shown in FIG. 6. The wrench-engaging feature 10 relates to a nut, screw, or a variety of other connectors or appropriately-shaped connections that allows for the utilization of a wrench or other such torque-enhancing tools with the present invention. The wrench-engaging feature 10 is laterally integrated into the brace flange 6. This arrangement enables the user to utilize a wrench or other tool to brace the wrench-engaging feature 10 to apply torque to the tubular brace 5, thus enabling more secure connection of the tubular brace 5 to other components and attachments.

Although the invention has been explained in relation to its preferred embodiment, it is to be understood that many other possible modifications and variations can be made without departing from the spirit and scope of the invention as hereinafter claimed.

What is claimed is:

1. An adapter for an expandable hose comprising:
a tubular insert;
a tubular brace;
an annular crimp;
at least one interchangeable hose connector;
the tubular insert comprising an insert flange, an insert annular groove, and an insert wedging feature;
the tubular brace comprising a brace flange, a brace annular groove, a brace male-threading feature, and a brace wedging feature;
the interchangeable hose connector comprising a connector inlet, a connector outlet, a first connector female-threading feature, a second connector female-threading feature, a connector valve, and a plurality of connector gripping ridges;
the insert flange and the insert wedging feature being positioned opposite to each other along the tubular insert;
the insert annular groove being laterally positioned around the tubular insert, adjacent to the insert flange;
the brace male-threading feature and the brace wedging feature being positioned opposite to each other along the tubular brace;
the brace flange being laterally positioned around the tubular brace, adjacent to the brace male-threading feature;
the brace annular groove being laterally positioned around the tubular brace;
the brace annular groove being positioned adjacent to the brace flange, opposite the brace male-threading feature;
the insert annular groove and the insert wedging feature being positioned inside the tubular brace;
the insert flange being positioned outside the tubular brace;
the insert flange being pressed against the brace male-threading feature;
the annular crimp being mounted around the brace annular groove;

the connector inlet being in fluid communication with the connector outlet;

the connector inlet and the connector outlet being positioned opposite to each other about the interchangeable hose connector;

the connector inlet being diametrically smaller than the connector outlet;

the first connector female-threading feature being positioned within the connector inlet;

the first connector female-threading feature being integrated into the connector inlet;

the second connector female-threading feature being positioned within the connector outlet;

the second connector female-threading feature being integrated into the connector outlet;

the connector valve being positioned in between the connector inlet and the connector outlet;

the connector inlet being in fluid communication with the connector outlet through the connector valve;

the plurality of connector gripping ridges being laterally connected to the connector outlet;

the plurality of connector gripping ridges being distributed about the connector outlet;

the plurality of connector gripping ridges being a plurality of connector splines; and each of the plurality of connector splines being positioned parallel to a central lengthwise axis of the interchangeable hose connector.

2. The adapter for an expandable hose as claimed in claim 1 further comprising:

the interchangeable hose connector further comprising a connector male-threading feature; and the connector male-threading feature being laterally connected about the connector inlet.

3. The adapter for an expandable hose as claimed in claim 1 further comprising:

a rigid sleeve;

the rigid sleeve comprising a first open end and a second open end;

the rigid sleeve being mounted around the tubular insert, the tubular brace, and the annular crimp;

the tubular insert, the tubular brace, and the annular crimp being positioned offset from the first open end; and the tubular insert, the tubular brace, and the annular crimp being positioned adjacent to the second open end.

4. The adapter for an expandable hose as claimed in claim 3 further comprising:

the interchangeable hose connector further comprising a connector male-threading feature;

the rigid sleeve further comprising a sleeve female-threading feature;

the connector male-threading feature being laterally connected about the connector inlet;

the sleeve female-threading feature being positioned within the second open end;

the sleeve female-threading feature being integrated into the second open end; and the sleeve female-threading feature being engaged by the connector male-threading feature.

5. The adapter for an expandable hose as claimed in claim 3 further comprising:

a plurality of sleeve gripping ridges;

the plurality of sleeve gripping ridges being laterally connected to the rigid sleeve;

the plurality of sleeve gripping ridges being distributed about the rigid sleeve;

the plurality of sleeve gripping ridges being a plurality of sleeve splines; and each of the plurality of sleeve splines being positioned parallel to a central lengthwise axis of the rigid sleeve.

6. The adapter for an expandable hose as claimed in claim 1 further comprising:

the tubular brace further comprising a wrench-engaging feature; and the wrench-engaging feature being laterally integrated into the brace flange.

7. An adapter for an expandable hose comprising:

a tubular insert;

a tubular brace;

an annular crimp;

at least one interchangeable hose connector;

the tubular insert comprising an insert flange, an insert annular groove, and an insert wedging feature;

the tubular brace comprising a brace flange, a brace annular groove, a brace male-threading feature, and a brace wedging feature;

the interchangeable hose connector comprising a connector inlet, a connector outlet, a first connector female-threading feature, a second connector female-threading feature, a connector valve, a plurality of connector gripping ridges, and a connector male-threading feature;

the insert flange and the insert wedging feature being positioned opposite to each other along the tubular insert;

the insert annular groove being laterally positioned around the tubular insert, adjacent to the insert flange;

the brace male-threading feature and the brace wedging feature being positioned opposite to each other along the tubular brace;

the brace flange being laterally positioned around the tubular brace, adjacent to the brace male-threading feature;

the brace annular groove being laterally positioned around the tubular brace;

the brace annular groove being positioned adjacent to the brace flange, opposite the brace male-threading feature;

the insert annular groove and the insert wedging feature being positioned inside the tubular brace;

the insert flange being positioned outside the tubular brace;

the insert flange being pressed against the brace male-threading feature;

the annular crimp being mounted around the brace annular groove;

the connector inlet being in fluid communication with the connector outlet;

the connector inlet and the connector outlet being positioned opposite to each other about the interchangeable hose connector;

the connector inlet being diametrically smaller than the connector outlet;

the first connector female-threading feature being positioned within the connector inlet;

the first connector female-threading feature being integrated into the connector inlet;

the second connector female-threading feature being positioned within the connector outlet;

the second connector female-threading feature being integrated into the connector outlet;

the connector valve being positioned in between the connector inlet and the connector outlet;

the connector inlet being in fluid communication with the connector outlet through the connector valve;

the plurality of connector gripping ridges being laterally connected to the connector outlet;

the plurality of connector gripping ridges being distributed about the connector outlet;

the plurality of connector gripping ridges being a plurality of connector splines;

each of the plurality of connector splines being positioned parallel to a central lengthwise axis of the interchangeable hose connector; and the connector male-threading feature being laterally connected about the connector inlet.

8. The adapter for an expandable hose as claimed in claim 7 further comprising:

a rigid sleeve;

the rigid sleeve comprising a first open end and a second open end;

the rigid sleeve being mounted around the tubular insert, the tubular brace, and the annular crimp;

the tubular insert, the tubular brace, and the annular crimp being positioned offset from the first open end; and the tubular insert, the tubular brace, and the annular crimp being positioned adjacent to the second open end.

9. The adapter for an expandable hose as claimed in claim 8 further comprising:

the rigid sleeve further comprising a sleeve female-threading feature;

the sleeve female-threading feature being positioned within the second open end;

the sleeve female-threading feature being integrated into the second open end; and the sleeve female-threading feature being engaged by the connector male-threading feature.

10. The adapter for an expandable hose as claimed in claim 8 further comprising:

a plurality of sleeve gripping ridges;

the plurality of sleeve gripping ridges being laterally connected to the rigid sleeve;

the plurality of sleeve gripping ridges being distributed about the rigid sleeve;

the plurality of sleeve gripping ridges being a plurality of sleeve splines; and each of the plurality of sleeve splines being positioned parallel to a central lengthwise axis of the rigid sleeve.

11. The adapter for an expandable hose as claimed in claim 7 further comprising:

the tubular brace further comprising a wrench-engaging feature; and the wrench-engaging feature being laterally integrated into the brace flange.

\* \* \* \* \*